United States Patent [19]

Schirmer

[11] 4,036,084

[45] July 19, 1977

[54] APPARATUS FOR REMOVING AND REPLACING SPIRAL SPRINGS IN CLOCK BARRELS

[76] Inventor: Marvin D. Schirmer, 05598 Levage Drive, Florence, Oreg. 97439

[21] Appl. No.: 717,536

[22] Filed: Aug. 25, 1976

[51] Int. Cl.[2] .......................... G04D 3/00; B23P 19/04

[52] U.S. Cl. .......................................... 81/7.5; 29/228

[58] Field of Search ............... 29/228; 81/7.5; 140/89, 140/124

[56] References Cited

U.S. PATENT DOCUMENTS

| | | | |
|---|---|---|---|
| 924,470 | 6/1909 | Kelley | 81/7.5 |
| 1,790,218 | 1/1931 | Appleby | 29/228 |
| 3,802,300 | 4/1974 | Gillotti | 81/7.5 |

*Primary Examiner*—James L. Jones, Jr.
*Assistant Examiner*—James G. Smith
*Attorney, Agent, or Firm*—D. Paul Weaver

[57] ABSTRACT

A support frame carries a rotary clock spring winding shaft having a reversible locking means. A set of variably sized spring retaining sleeves are provided and are selectively placed on the winding shaft according to the size of the clock spring barrel. A parallel stationary shaft on the support frame mounts a group of adjustable spring end holding elements which cooperate with the winding shaft during the winding up or unwinding of the clock spring. The apparatus effects removal and replacement of the clock spring in its barrel or retainer in a very simple manner without injuring the spring or the hands of the manipulator.

11 Claims, 11 Drawing Figures

FIG. 1
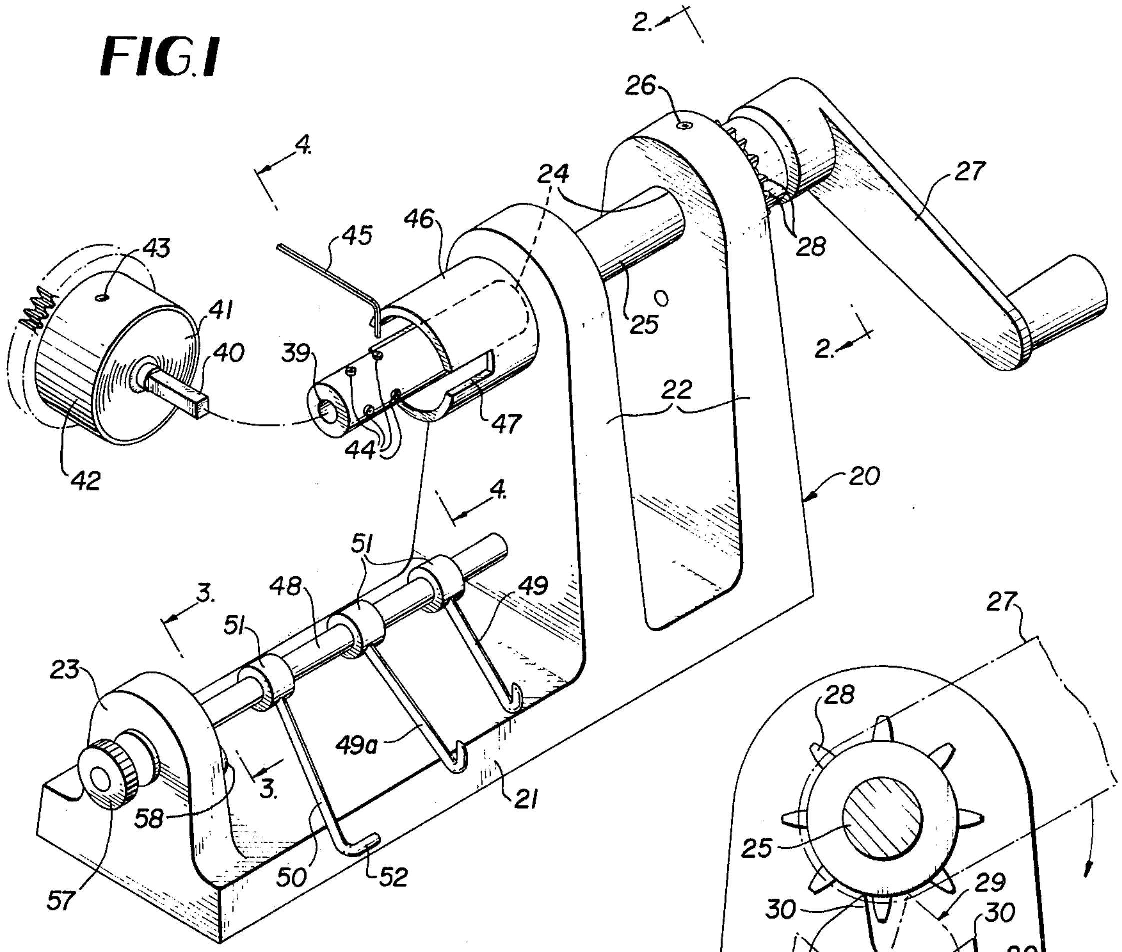
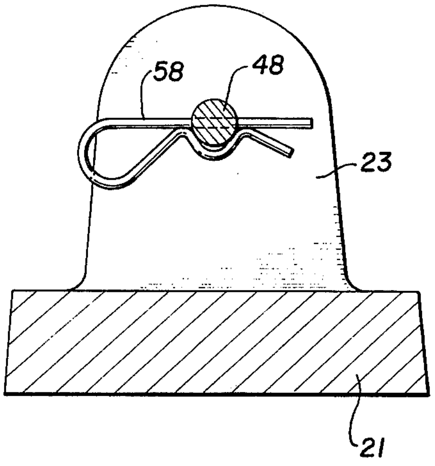
FIG. 3
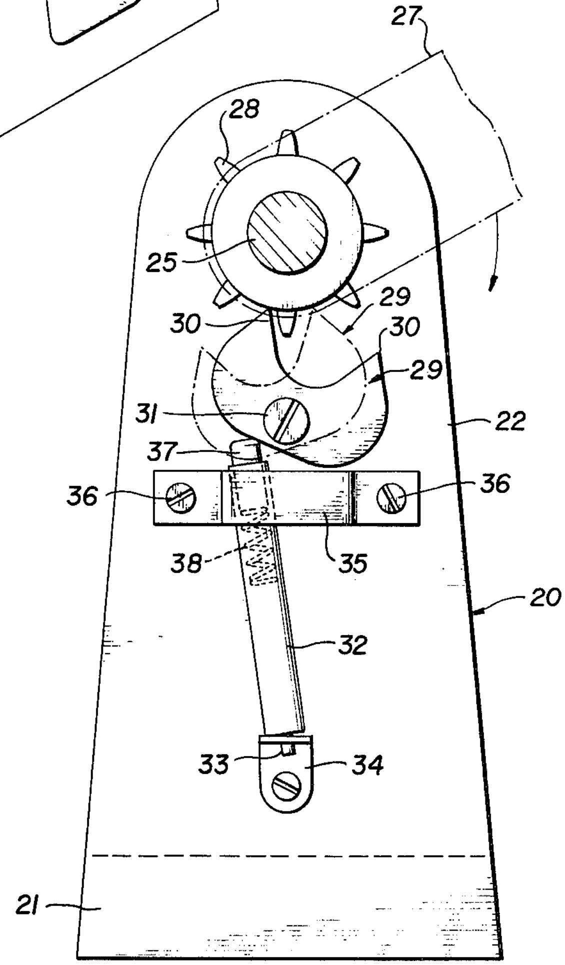
FIG. 2

APPARATUS FOR REMOVING AND REPLACING SPIRAL SPRINGS IN CLOCK BARRELS

BACKGROUND OF THE INVENTION

Clock springs require periodic cleaning and oiling and to perform this service the spiral spring must be removed from its barrel or spring retainer, depending on the type of spring involved. The operation as performed with existing aids and implements is awkward and difficult and may result in damage to the clock spring and/or injury to the hands of the technician. Insofar as is known, no entirely satisfactory means has been devised in the prior art to deal with the problem of removing and replacing clock springs from their barrels and retainers for periodic servicing, and it is the main object of this invention to completely solve this problem through the provision of a simplified, sturdy and entirely reliable apparatus for use by jewelers and other clock servicing technicians.

Examples of the patented prior art are U.S. Pats. Nos. 920,098; 1,790,218; 924,470; 1,676,740; and 3,802,300.

Other features and advantages of the invention will become apparent during the course of the following description.

BRIEF DESCRIPTION OF THE DRAWINGS

FIG. 1 is a partly exploded perspective view of the invention.

FIG. 2 is an enlarged vertical section taken on line 2—2 of FIG. 1

FIG. 3 is a similar view taken on line 3—3 of FIG. 1.

DETAILED DESCRIPTION

Figure 4:
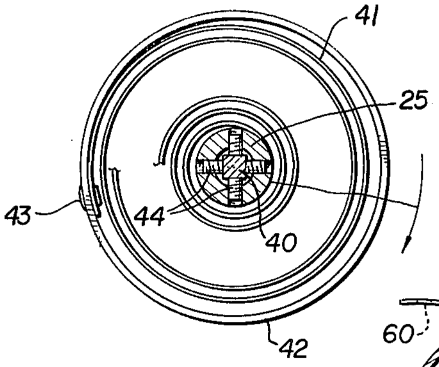
FIG. 4 is a similar view taken on line 4—4 of FIG. 1

Referring to the drawings in detail wherein like numerals designate like parts, the numeral 20 designates a rigid support frame having a base 21 and a pair of spaced upstanding posts 22 rising from the base. A considerably shorter parallel upstanding frame member 23 is formed on the base 21 at its end remote from the posts 22. Near their tops, the two posts 22 have coaxial openings 24 for the rotational support of a winding shaft 25 which is held against axial displacement on the support frame by a conventional means 26. This shaft carries a crank handle 27 on one end thereof and also carries a locking ratchet gear 28 fixed thereto between the handle 27 and the end post 22. The cooperating reversible locking pawl 29 having two spaced teeth 30 is pivoted to the end post 22 by a center pivot means 31.

The pawl 29 is reversed by operation of a small tube 32 on the outer side of end post 22 having its lower end rockably mounted as at 33 on a mounting bracket 34 which is fixed to the end post. The upper end of this rockable tube is shiftably mounted within a guide strap member 35 also fixed on the end post 22 by screws 36.

The rockable tube contains a pawl-engaging plunger 37 in its upper end, which plunger is biased forwardly by a spring 38 held within the tube 32. Shifting of the tube 32 back and forth between the ends of the guide strap 35 with a pivoting motion on the bracket 34 will shift the locking pawl 29 to either of its locking positions shown in FIG. 2. In one position, retrograde movement in one direction of the winding shaft 25 is prevented and in the other position of the pawl, retrograde movement in the opposite direction of the winding shaft 25 is prevented. The rocking movement of the pawl 29 in either direction on its pivot 31 is limited by the top of guide strap 35.

The end of winding shaft 25 remote from crank handle 27 has a socket opening 39 adapted to receive the square arbor 40 of a conventional clock spring 41 held within a cylindrical barrel 42 with one end of the spring detachably connected to the barrel by an element 43, the other end of the spring being attached to the arbor 40. Preferably, four circumferentially spaced pairs of radial set screws 44 on the winding shaft 25 and adjacent the socket 39 engage the flats of the square arbor 40 to secure the same removably in the socket opening 39 of the winding shaft. An allen wrench 45 for adjusting the set screws 44 is provided with the apparatus.

Figure 9:
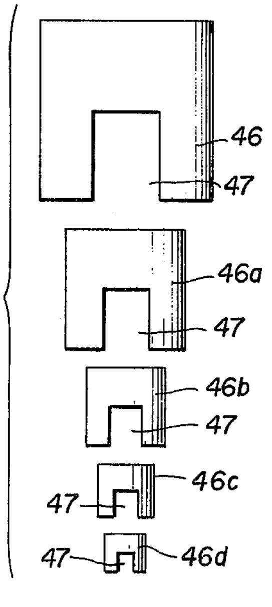
FIG. 9 is a composite side elevation showing a set of sleeve elements constituting a part of the apparatus.

As shown in FIG. 9, a plurality, such as five, cylindrical sleeves **46, 46*a*, 46*b*, 46*c* and 46*d* is provided, each sleeve being of a different diameter to fit into clock spring barrels 42 of varying diameters, and each sleeve having a forward end slot 47 formed in its side wall, for a purpose to be described. During the operation of the apparatus, one of the sleeves 46–46*d* is placed loosely over the shaft 25 ahead of the intermediate post 22, FIG. 1, and the largest sleeve which will fit telescopically in the barrel 22** of the particular clock spring being serviced is selected.

Near and above the base 21 and spaced below the winding shaft 25 and parallel thereto is a support shaft or rod 48 for a group of spring end holding hooks **49, 49*a* and 50, each hook being attached to a sleeve body 51 which may be rotated on the support shaft 48 and easily slid axially thereon to a selected use position. The two hooks 49 and 49*a* are of different lengths, as shown in FIG. 1, and as will be fully described the longer hook 49*a* is employed in the operation of removing the clock spring 41 from the barrel 42 for servicing, and the shorter hook 49 is employed to replace the clock spring in the barrel 42. The third hook 50 having a hook terminal 52 parallel to the axis of shaft 48 is employed instead of the hooks 49 and 49*a*** in the operations of removing and replacing a different type of clock spring 52, FIG. 10, having an attached arbor 54 and a rigid retainer element 55 and an open loop end 56. The apparatus is fully capable of serving both conventional types of clock springs shown in FIGS. 1 and 10, as will be further described.

The support shaft 48 is supported on the frame 20 within coaxial openings of the intermediate post 22 and frame part 23. The shaft 48 may be equipped with a knob 57 on one end thereof to facilitate mounting and removing the shaft on the frame 20. The shaft 48 is retained on the frame 20 by a spring retainer pin 58 immediately inwardly of frame part 23 as shown in FIG. 3. When clock springs are encountered which wind counterclockwise, the pin 58 is removed and the shaft 48 is removed form the frame 20 and the two hooks 49 and **49*a* are removed and reversed on the shaft 48 and the shaft is then remounted on the frame 20.** This simple arrangement increases the versatility of the apparatus for servicing all types of clock springs.

The use or operation of the apparatus in FIG. 1 for removing and replacing the clock spring 41 in the barrel 42 can best be understood by considering drawing FIGS. 4 through 8.

In FIG. 4, the spring arbor 40 has been installed in the socket opening 39 and secured by set screws 44. Prior to this, a sleeve **46–46*d*** of the largest diameter which will fit inside of the barrel 42 is placed on the shaft 25 as shown in FIG. 1 with the slot 47 facing the open end of the barrel 42, the customary cover of which has been removed.

The exterior of the barrel 42 is now gripped firmly with one hand to keep it from turning and the spring 41 is wound up and contracted within the barrel 42 as shown by the arrow in FIG. 4 by turning the crank handle 27 with the other hand, the properly adjusted locking pawl 29 preventing reverse rotation of the winding shaft 25 when the spring winding operation ceases. The spring 41 is still attached at 43 to the barrel 42, FIG. 4.

Figure 5:
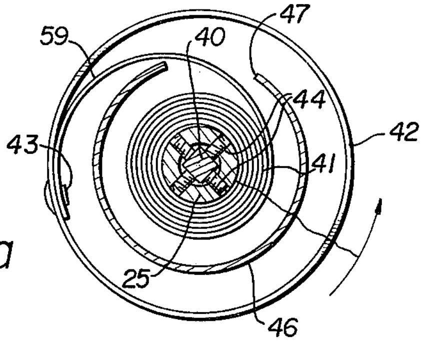
FIGS. 5, 5a, 6 and 7 are similar cross sectional views depicting a series of steps involved in removing the clock spring from its barrel.

As shown in FIG. 5, when the spring 41 is fully wound up and contracted, the sleeve 46 is shifted forwardly on the shaft 25 so that the outer terminal end portion 59 of the spring enters the slot 47. Preferably, the sleeve 46 is now turned circumferentially to shift the slot 47 toward the wound-up spring as far as possible. The terminal end 59 is still attached at 43 to the spring barrel 42, the terminal end being apertured to hook over the element 43.

Figure 5A:
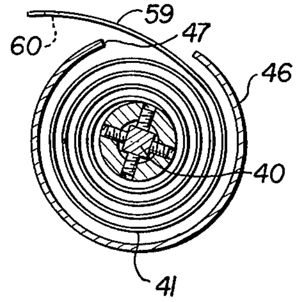

Referring to FIG. 5*a*, the ratchet mechanism is now reversed by shifting the tube 32 in the guide strap 35, as described, and the spring 41 is unwound or expanded in the sleeve 46 which holds it securely independently of the barrel 42. The apertured spring terminal 59 is now easily released from the barrel 42 and the barrel is removed, FIG. 5*a*.

Figure 6:
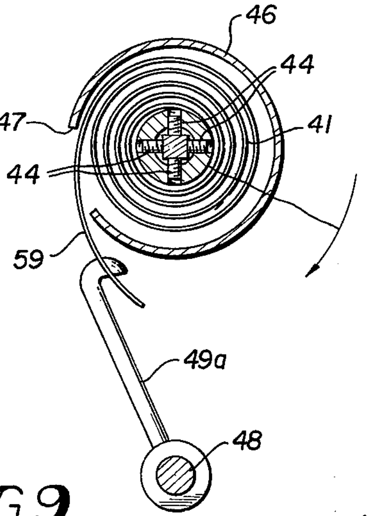
Figure 7:
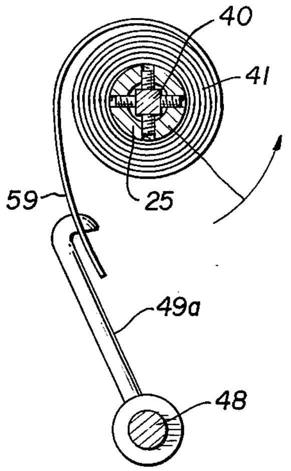

Referring to FIG. 6, the longer hook **49*a* is engaged through the aperture 60 of spring end 59 and the spring is wound up and retracted by use of the crank 27, as indicated by the arrow in FIG. 6. The sleeve 46 is now removed from the spring and while the spring is still held by the hook 49*a*, it is now unwound and fully expanded, preferably while holding the opposite end faces of the spring between thumb and finger to prevent buckling. When the spring is fully relaxed, the spring and arbor 40** are separated from the apparatus so that the spring can be cleaned and oiled. The spring removal process, abovedescribed, is fast and efficient and avoids deforming or otherwise damaging the spring.

Figure 8:
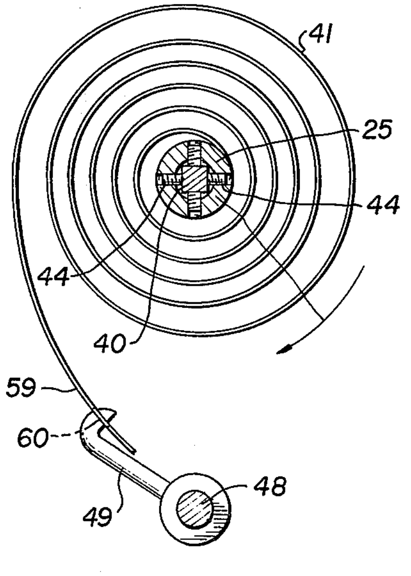
FIG. 8 is a similar view showing the first of a reverse sequence of operations involved in replacing the clock spring in the barrel.

When replacing the spring 41 in the barrel 42, a reverse sequence of operations is performed and only the first of these operations is depicted in the drawings by FIG. 8, the subsequent reverse steps requiring no drawing illustration for a full understanding of the invention.

In FIG. 8, the square arbor 40 of the spring has been remounted in the socket 39 of winding shaft 25. The shorter hook 49 is engaged with the spring aperture 60 and the spring is now wound up and contracted by use of the crank 27 while being held between the fingers to prevent axial buckling. After winding, the particular sleeve **46–46*d*, not shown, is placed over the contracted spring and the spring is unwound and expanded in the sleeve. At this point, the spring terminal 59 is released from the hook 49 and preferably the crank 27 is turned until the terminal or end 59 faces upwardly in the apparatus. The end 59 may now be pressed down with the thumb and the barrel 42 may be slid over both the spring and sleeve 46. The barrel 42 is now rotated until the aperture 60 snaps over the barrel spring connector element 43. The barrel 42 is now held with one hand to prevent turning and the spring is again wound up and contracted. The sleeve 46 is shifted and removed from the spring and the spring is unwound and expanded in the barrel 42. The barrel with spring 41 and arbor 40 is now separated from the apparatus after releasing set screws 44** and after replacement of the barrel cover, not shown, the spring assembly is ready for replacement in a clock.

The feature of reversibility of the hooks 49 and **49*a* on shaft 48** to accommodate counterclockwise wound springs has already been described.

Figure 10:
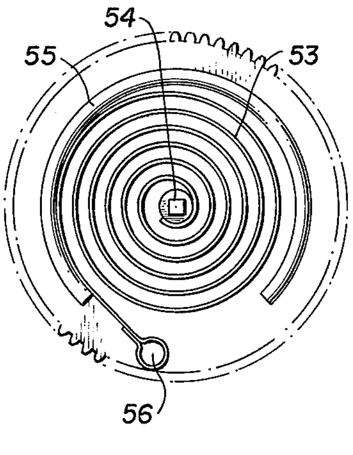
FIG. 10 is an end elevational view of a different form of clock spring having an open loop end and a rigid retainer and which the invention is also adapted to service.

When a clock spring assembly of the type described in FIG. 10 is encountered, the same basic operation abovedescribed is carried out with the apparatus, except that the hook 50 is employed in the spring removal and replacement operation instead of the hooks 49 and **49*a*. The axial terminal 52 of hook 50 engages in the open loop 56 on the end of spring 53. The spring 53 is wound up and contracted so that the rigid retainer 55 can be removed. The ratchet mechanism is reversed and the spring is then unwound and expanded while steadied with thumb and finger to prevent buckling. Spring 53 and arbor 54 are now removed from the apparatus and the spring is cleaned and oiled. Following this, the arbor 54 is replaced in the socket opening 39 and the set screws 44 are tightened. The spring loop 56 is connected with hook 50 and the spring is again wound up and the rigid retainer 55** is reinstalled over the spring and the spring can be unwound since the retainer will confine it. The spring assembly is removed from the apparatus and is ready for replacement in a clock.

The versatility of the invention and its simple modes of operation with two types of clock springs and various sizes of spring barrels has now been amply explained, and it is believed that those skilled in the art will fully appreciate the features and advantages of the invention over the prior art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. Apparatus for removing clock springs from their mountings and for replacing the springs after servicing, said apparatus comprising a support body, a spring winding and unwinding rotary shaft journaled on the support, reversible locking means for said rotary shaft to lock the same against retrograde movement selectively in opposite directions, said rotary shaft having coupling means adapted for connection releasably with a clock spring arbor, at least one transfer sleeve having an end slot adapted for placement over the rotary shaft, a second shaft parallel to the rotary shaft on said support body and spaced laterally from the rotary shaft, and at least one clock spring end engaging and securing hook on said second shaft and shiftable axially and circumferentially thereon to selected positions of use.

2. The apparatus of claim 1, and said reversible locking means comprising a ratchet gear on said rotary shaft, a double-toothed locking pawl rockably mounted on the support body and shiftable toward and from two locking positions of engagement with the ratchet gear, and a shiftable element on the support body operatively engaging said double-toothed locking pawl to move the latter in opposite directions.

3. The apparatus of claim 2, and said shiftable element comprising a member pivoted to said support body and having an end slidably engaging said pawl.

4. The apparatus of claim 3, and said end formed by a spring-urged contact element on said member.

5. The apparatus of claim 1, and a hand crank on said rotary shaft for turning the same.

6. The apparatus of claim 1, and said coupling means comprising an end socket opening in the rotary shaft, and radial set screw means on the rotary shaft adjacent to and intersecting said socket opening.

7. The apparatus of claim 6, and said set screw means comprising plural circumferentially spaced groups of radial set screws.

8. The apparatus of claim 1, and a plurality of said transfer sleeves of varying diameter to coact with clock spring barrels of correspondingly differing diameters.

9. The apparatus of claim 1, and said second shaft being removable axially from said support body, and readily removable means for securing the second shaft on the support body.

10. The apparatus of claim 9, and plural clock spring end engaging and securing hooks of different lengths on said second shaft and being reversible thereon when one end of the second shaft is retracted from its engaged position with the support body.

11. The apparatus of claim 10, and one of said hooks having a spring-engaging terminal parallel to the axes of said rotary shaft and second shaft, the terminals of the other hooks being transverse to the axes of said shafts.

* * * * *